United States Patent [19]
Partee et al.

[11] Patent Number: 6,137,660
[45] Date of Patent: *Oct. 24, 2000

[54] METHOD FOR REDUCING ESD AND IMAGING DAMAGE DURING FOCUSED ION BEAM DEFINITION OF MAGNETORESISTIVE HEAD WRITE TRACK WIDTH

[75] Inventors: Charles Partee, Boulder, Colo.; James R. Carter, Shrewsbury, Mass.

[73] Assignee: Matsushita-Kotobuki Electronics, Ehime, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/999,293

[22] Filed: Dec. 29, 1997

[51] Int. Cl.[7] .................................................. G11B 5/127
[52] U.S. Cl. ................ 360/313; 204/192.34; 204/192.32; 204/192.35; 204/192.36
[58] Field of Search ........................... 204/192.12, 192.2, 204/192.17, 192.15, 192.23, 192.22, 192.26, 192.34, 192.32, 192.35, 192.36; 360/110, 128, 126, 113, 313

[56] References Cited

U.S. PATENT DOCUMENTS

| | | |
|---|---|---|
| 5,141,623 | 8/1992 | Cohen et al. ............................ 205/122 |
| 5,200,056 | 4/1993 | Cohen et al. ............................ 205/122 |
| 5,314,596 | 5/1994 | Shukovsky et al. ................. 204/192.2 |
| 5,465,186 | 11/1995 | Bajorek et al. .......................... 360/113 |
| 5,618,639 | 4/1997 | Ohno et al. .............................. 428/694 |
| 5,635,037 | 6/1997 | Chu et al. ........................... 204/192.35 |
| 5,681,426 | 10/1997 | Schultz et al. ....................... 156/654.1 |
| 5,752,309 | 5/1998 | Partee et al. ......................... 29/603.18 |
| 5,804,085 | 9/1998 | Wu et al. .................................. 216/22 |
| 5,835,315 | 11/1998 | Cohen et al. ............................ 360/126 |
| 5,916,423 | 6/1999 | Westwood .......................... 204/192.32 |
| 5,985,104 | 11/1999 | Westwood .......................... 204/192.15 |

*Primary Examiner*—Nam Nguyen
*Assistant Examiner*—Steven H. Ver Steeg
*Attorney, Agent, or Firm*—William J. Kubida; John R. Wahl; Hogan & Hartson LLP

[57] ABSTRACT

A magnetoresistive read/recording head for use in a fixed disk drive data storage device is formed by the steps of first, photolithographically depositing the head on one surface of a slider block, second, applying, a conductive film preferably of carbon or a silicon/carbon multi-layer film over the head and onto the block surface, and then milling the write tip portion of the head with a focused ion beam. The remaining conductive film is then removed in an oxygen plasma which chemically removes the remaining conductive film. The conductive layer is transparent to the focused ion beam and conducts electrostatic charge away from the head during the milling operation thus preventing electrostatic discharges from occurring which otherwise would damage the head.

13 Claims, 1 Drawing Sheet

METHOD FOR REDUCING ESD AND IMAGING DAMAGE DURING FOCUSED ION BEAM DEFINITION OF MAGNETORESISTIVE HEAD WRITE TRACK WIDTH

BACKGROUND OF THE INVENTION

1. Field of the Invention

This invention relates generally to the manufacture of magnetic recording heads utilized in magnetic disk data storage devices and more particularly to a method for reducing damage to a magnetoresistive (MR) head during focused Ion Beam definition of the write head track width.

2. Description of the Related Art

Fixed disk data storage devices typically are magnetic disk devices which utilize a head disk assembly enclosed within a sealed volume with its associated electronics circuitry located adjacent, above or below the sealed head disk assembly or "HDA". The head disk assembly typically includes one or more planar disks stacked on a rotating hub of an included spindle drive motor. Each disk has a magnetic media on its upper and lower surfaces. One or more actuator assemblies for positioning magnetic transducers (heads) over the upper and lower surfaces of the disks is positioned adjacent the stack of disks and includes a rotary motor means such as a voice coil motor for rotating arms, which carry the heads, back and forth over the disk surfaces in order to read and write information from and to the disks.

Most of the conventional disk drives available today contain a single stack of disks and a single voice coil motor operated actuator assembly which utilizes a moving coil attached to the actuator itself. The actuator has the same number of heads as surfaces on the disks. The inner actuator arms typically carry two opposing heads, one for the lower surface of the disk immediately above and one for the upper surface of the immediately adjacent lower disk are. Actuator arms constantly being redesigned so as to be smaller and smaller in order to accommodate more and more disks in a given form factor.

There have been a number of attempts to increase the capacity of hard disk drives in other ways as well. One approach has been to increase the number of tracks on each disk surface. This requires making the tracks narrower, which inherently means that the write heads must be narrower, thinner and smaller. Also, as track widths gets narrower, interference between adjacent tracks during both read and write operations becomes a problem. One of the more innovative solutions which has led to smaller track widths has been the introduction of dual gap heads which utilize a separate gap for write operations and a separate gap containing a magnetoresistive (MR) element therein for read operations. These MR recording/read heads typically have three spaced pole tips forming two gaps, a write gap and a read gap. Separate gaps means that each can be optimized for its particular purpose, rather than representing a dimensional compromise.

The MR read/recording heads are formed on the trailing end surface of a slider block. The pole tip gaps are formed at the bottom edge of the trailing end surface of the slider block such that the tips face the media surface of the disk. The slider is in turn mounted on and carried at the end of an actuator arm which is positioned so that as the disk rotates, the slider floats on an air cushion, i.e., an air bearing film immediately above the media surface with the read/write pole tips as close as possible to the media without being in actual contact. The underside surface of the slider constitutes an air bearing surface for this purpose.

The head includes a top pole, a shared pole member commonly called the shared shield, and a bottom pole member commonly called the bottom shield. The latter two pole members are called shields because the magnetoresistive read element is placed in the gap between the shared shield and the bottom shield. These heads, commonly known as MR heads, are manufactured by photolithography techniques on an upper surface of a hard ceramic wafer, which later is cut into generally rectangular slider blocks with the upper surface of the wafer becoming the trailing end surface of the slider.

U.S. Pat. No. 5,314,596 describes the conventional wafer and slider bar processing steps. In general, a large number of MR heads are deposited on an upper planar surface of the wafer in a series of deposition steps involving depositing a series of alternating layers of a ferromagnetic flux conductive material, such as a nickel iron alloy (NiFe) and non-magnetic electrically insulating material on the surface of the wafer. The conductive layers are each deposited as a thin film on the wafer planar surface. A photoresist is then deposited over the conductive thin film and a photolithographic mask is positioned over the photoresist covered wafer. The wafer is then exposed to light. This exposure causes the exposed areas of the photoresist to be resistant to chemical washing, in the case of a positive photoresist. In the case of a negative photoresist, the opposite occurs. In either case, the mask must be appropriate to the photoresist being used. After exposure to light, this mask is removed. The appropriate exposed or unexposed photoresist portions are washed away, depending on the type of photoresist used, leaving behind an exposed patterned surface of the conductive layer. A chemical etch process is then applied to the exposed conductive layer to remove the exposed patterned portions of the conductive layer. The remaining photoresist is then removed, leaving the desired pattern of conductor layer on the planar surface of the wafer. This patterned conductor layer defines the first pole of the head.

Next, an insulating layer is deposited and patterned in a similar manner as just described, and another conductive layer deposited. Then another photoresist is applied and another photolithographic mask positioned and the surface of the wafer again exposed to light. The mask is again removed and the unexposed photoresist portions washed away, leaving, exposed another patterned surface of resist and conductive layer. This process is repeated to complete the build up of the pole pieces and the coils for each of an array of identical heads on the planar surface of the wafer.

After the heads are formed on the upper surface of the wafer, the wafer is cut into strips or bars each containing a row of unseparated individual heads on one face thereof. The adjacent, orthogonal face of the bar on which the pole tips lie is defined as the air bearing surface and is shaped to provide the desired flying height characteristics of the head by lapping, sawing, ion etching, and/or ablative processes into the desired air bearing surface shape. The underside air bearing surface of the bar is then finally polished.

Next, the pole tips of each of the heads on each bar are trimmed by Focused Ion Beam (FIB) milling. This step is very critical to minimizing the write track width. Typically, the FIB milling step notches the pole tips to provide a precisely defined narrow width at the ends of each set of pole tips. This FIB notching, typically accomplished with a focused beam of positive ions, such as Gallium ions, ablates the pole tip material to produce the notched tips. The tips also must be accurately imaged and located prior to the milling operation. This preliminary imaging and locating step is also done with the focused ion beam. This preliminary step involves a short scan, but some of the ions may be implanted in the surface of the pole tip and some ablation of the tip occurs during this step as in the actual milling, operation. Therefore the time period for imaging and locating is kept very short to minimize this damage.

Once the tips are accurately imaged and located, the FIB mills the corners of the pole tips to define the precise width desired. During this FIB milling operation, some of the Gallium ions are embedded, i.e. implanted in the end surface of the pole tip, thus requiring a final lapping operation to remove these implanted ions and restore the desired magnetic characteristics of the NiFe pole tip material. This process is further described in U.S. patent application Ser. No. 08/982,542, allowed, Attorney Docket No. Q96-1046-US1 which is hereby incorporated by reference herein in its entirety.

A build up of electrical charge on the head surface also occurs during both the imaging and FIB milling operations since the focused beam is a beam of positive ions. Therefore a broad flood beam of electrons is supplied across the bar surface during the FIB etching process to neutralize this electrical charge. In actuality, though, the charge is not consistently and continually neutralized by this electron flood beam. In fact, surface charges build up and then dissipate over and over during the use of the focused ion beam.

Sometimes the charge builds up substantially and generates an arc when the charge discharges. These arcs are electrostatic discharges (ESD) and can damage the sensitive MR elements. Therefore there is a need for a method to eliminate the effects of ESD in order to increase the yield of good MR heads from the bars.

The FIBbed bars are cut into individual sliders and resistance checks performed on each slider after the FIB milling or etch process. A final lapping process is applied to each head that passes the resistance checks to achieve the desired final characteristics.

The failure rates mentioned above due to ESD damage have been acceptably low in the manufacture of anisotropic magnetoresistive (AMR) heads but substantially affect the cost of the final product. Further, ESD damage is prohibitively significant in the manufacture of Giant Magnetoresistive (GMR) heads. Therefore there is a need for a mechanism to eliminate these ESD failures in the manufacture of both AMR and GMR heads.

SUMMARY OF THE INVENTION

The primary object of the invention is to provide a method of manufacturing a magnetoresistive read/recording head which eliminates ESD damage.

It is another object of the invention to prevent substantive implantation of undesirable energetic ions in the head material during focused ion beam definition of write head poles.

It is another object of the invention to prevent ESD damage during the MR head manufacturing process by providing a conductive coating on the head during FIB etching.

A method of manufacturing a read/record head in accordance with the present invention initially includes a series of conventional wafer and slider bar photolithographic processing steps which include:

depositing a first layer of ferromagnetic material over the upper surface of the substrate, dimensioning the first layer through a photolithographic process to form a first pole, depositing an insulating layer, photolithographically depositing a magnetoresistive element, depositing another insulating layer, depositing another layer of ferromagnetic material and dimensioning the layer via photolithographic techniques to form a shared pole member, depositing alternating coil and insulating layers until the coil is complete, electrically wrapping around the shared pole or shield, depositing and dimensioning another layer of ferromagnetic material as a top pole member to complete the buildup of the MR head on the substrate surface.

The head thus formed has a coil wrapped around the shared shield with the shared shield and first pole forming a magnetic circuit to shield the magnetoresistive element and the shared shield and the top pole forming a magnetic circuit for write operations. The wafer with the array of heads thereon is then sliced into strips or bars each having a row of heads on one surface with all of the pole tips facing the sliced orthogonal surface of the bar. This sliced surface is then shaped and lapped to become the air bearing surface for the slider blocks having, very specific surface characteristics.

Next, a conductive film, preferably an organic film such as a carbon layer or a silicon/carbon multi-layer film, is deposited over the head and which extends onto the slider bar surface. This conductive organic film provides a dissipative electrical path away from the head to the bar substrate for dissipation of electrostatic charge which can otherwise build up during the next few steps in the manufacturing process.

The formed bar of heads is next placed in a precision indexing holder. A broad electron beam wash is directed over the head surface and a focused ion beam (FIB) of positive ions, typically gallium, is briefly directed to one of the heads to image and exactly locate the write pole tip. Once accurately indexed, the FIB then carves out a notch on each side of the write or top pole to precisely dimension the top pole tip. The FIB may also be used to carve away a step in the shared pole or shield to form a raised pole tip opposite and aligned with the top pole tip and thus further reduce and precisely define the width of the write track which can be subsequently written by the head.

The conductive film dissipates any charge buildup on the surface of the head and also absorbs charged ions of the beam minimizing the number and energy of ions implanted in the head. Once the FIB milling operation is complete, the FIB is moved to the next head on the bar and the process repeated to notch the pole tips. After all heads on the bar are FIBbed, the bar is removed from the holder and subjected to a plasma ash process, i.e., placed in an oxygen plasma. The carbon forms volatile $CO_x$ compounds which are then pumped away under vacuum.

The bar is then sliced into individual sliders and the air bearing surface is preferably, but optionally, subjected to a final lapping step to remove any unwanted ion implantations in the pole tip which would otherwise adversely affect the magnetic properties of the pole tip. The use of the conductive film prevents any ESD damage to the heads during the FIB steps and reduces the number of unwanted ion implantations.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

Figure 1:
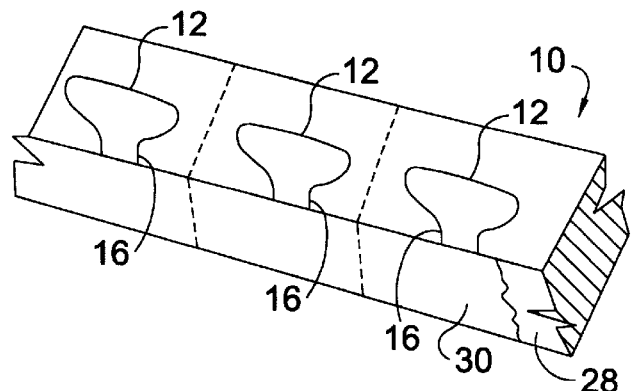
FIG. 1 is a perspective side view of a portion of a slider bar showing a series of magnetoresistive heads formed thereon and the underside orthogonal slider surface prior to FIB etching to narrow the pole tips in accordance with the present invention.
Figure 2:
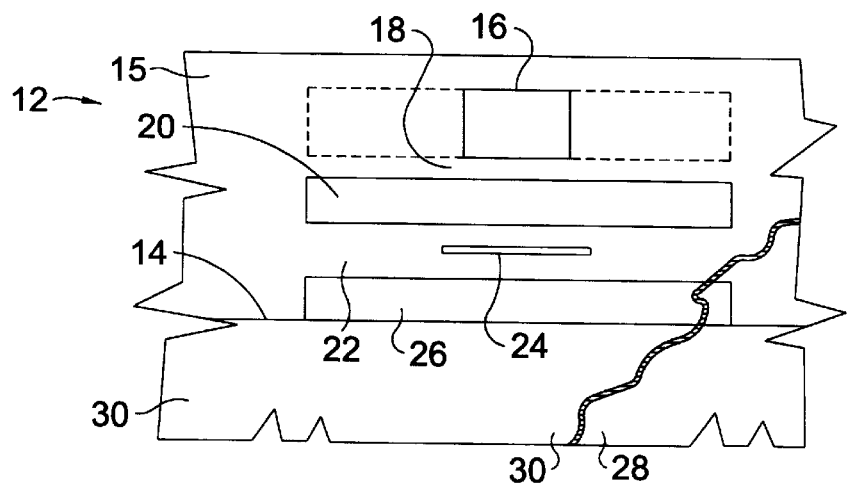
FIG. 2 is a partial bottom view of the bar in FIG. 1 after deposition of a transparent conductive layer over the bottom surface and over the head tips in accordance with the invention.

Referring now to the drawing, a bar 10 of slider block material carrying a plurality of partially formed MR heads 12 photolithographically deposited on an upper surface 14 thereof is shown in a perspective view in FIG. 1 and in a bottom or air bearing surface view in FIG. 2. The heads 12 are encapsulated in an over-layer 15 of a dielectric material such as aluminum oxide, which is not shown in FIG. 1 for clarity, but is shown in FIG. 2. As is best shown in FIG. 2, the MR head 12 has a top pole 16, a write gap 18, a shared pole 20, a read gap 22, an MR element 24 disposed in the read gap 22, and a bottom pole 26.

In the views of FIGS. 1 and 2, the bar 10 has not yet been sliced into individual sliders. However, the bottom air bearing, surface 28 has been shaped and lapped into a near final form. However, the notching, i.e. final shaping of the top pole 16, write gap 18 and the shared pole 20 has not yet been completed. The method of manufacturing the heads 12 is conventional up to this point.

Now a conductive layer 30, such as a silicon/carbon multi-layer or a carbon film layer is deposited, over the entire bottom surface 28 of the bar 10 and the head 12 so as to cover the pole tips 16, 20, 26, and the MR element 24. The layer 30 may extend up and over at least a portion of the over-layer 15, although this is not required. This carbon layer or silicon/carbon multilayer 30 is transparent to light and also transparent to a beam of Gallium ions. This layer 30 is then preferably electrically grounded in preparation for the next step of the manufacturing process.

Next, a broad wash beam of electrons is directed over the surface of the layer 30 and a focused Gallium ion beam (FIB), directed orthogonally to the plane of the air bearing bottom surface 28, is used to precisely locate the left and right corners of the top pole 16 which are closest to the write gap 18. During this step, any Gallium ions that are implanted in the impacted surface are implanted in the surface of the silicon carbide conductive layer rather than actually in the head 12. In addition, the carbon layer 30 readily conducts electrons from the broad electron beam wash from the slider bar body 10 to any implanted Gallium ions to thus neutralize any charge buildup before it can build up to a level that produces damaging ESD.

Next, the FIB mill or etch operation is performed to reduce and precisely define the write pole tip 16 width and optionally form a raised pole tip on the shared pole 20. Any Gallium ions that could implant and damage the sensitive MR element 24 are implanted in the conductive coating 30 during the FIB etch rather than in the MR element itself. Further, any ablated tip material from the pole tip 16 that would otherwise be implanted in the insulating material of the write gap 18 or into the MR element 24 are instead implanted in the conductive overcoat 30.

Figure 3:
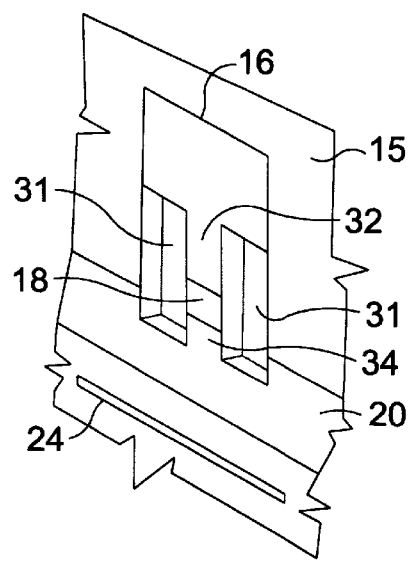
FIG. 3 is an enlarged view of the head tips as in FIG. 2 after FIB milling and removal of the conductive layer via plasma ash in accordance with the invention.

The FIB milling step produces a closed square bottom trough or blind slot 31 in the identified corners of the top pole 16 to define a narrowed pole tip 32 of the top pole 16 in the bottom surface of the bar 10. As is shown in FIG. 3, the top pole 16 thus ends up having a notch on each side to narrow the width of the pole tip 32. In addition, the shared shield 20 is preferably milled to provide a raised tip 34 at the other end of the slot 31 opposite and aligned with the notched and thus narrowed pole tip 32.

After the FIB milling step, the bar 10 is subjected to an oxygen plasma ash wash process to chemically remove the conductive layer 30. The volatile $CO_x$ compounds formed in the ash wash process are pumped away from the bar 10 under vacuum. The resulting finished head shape is shown in FIG. 3.

Next, resistance checks are taken and then the bar 10 is sliced along the dotted lines in FIG. 1 into individual sliders with one head 12 on each slider. Finally, the sides of the slider are lapped and the bottom air bearing surface 28 is subjected to a final lapping and polish step which may include deposition of a carbon overcoat to minimize friction between the disk (not shown) and the air bearing surface 28. As presently envisioned, the two blind slots 31 defining the raised shared pole tip 34 and the narrowed write pole tip 32 remain unfilled with any material. However, these slots may be filled with a dielectric filler material to enhance flying characteristics of the heads in operation.

The present invention may be practiced otherwise than as specifically described above. Many changes, alternatives, variations, and equivalents to the various structures shown and described will be apparent to one skilled in the art. For example, the conductive film layer 30 may be other than carbon or silicon/carbon multi-layer. It may be any conductive film material, preferably organic so as to be easily removable via plasma ash process, as long as it is substantially transparent to the focused ion beam being used to mill the pole tip. The conductive film applied in accordance with the present invention may also be used in any other process utilizing a FIB process step to prevent ESD damage. Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. A method of preventing electrostatic discharge damage in a manufacturing process comprising the steps of:
   providing a surface to be ion milled;
   applying a conductive film coating onto the surface to be ion beam milled;
   ion beam milling through said conductive film coating to the surface using a focused ion beam after application of the conductive film coating; and
   during the step of ion beam milling, conducting electric charge developed on the surface using the applied conductive film.

2. The method according to claim 1 wherein said surface to be ion milled is a pole member of a magnetoresistive read/record head.

3. The method according to claim 2 further comprising the steps of:

ion milling said pole member; and immersing said coated surface in an oxygen plasma to remove said conductive film.

4. The method according to claim 1 wherein said conductive film coating is a carbon film or a silicon/carbon multi-layer film.

5. A method of forming a magnetoresistive read/recording head assembly comprising the steps of:

providing a slider block surface;

forming a magnetoresistive read/recording head on said slider block surface;

applying a conductive film over said head and on said block surface;

milling at least a portion of said head through said conductive film with a focused ion beam, after applying said conductive film;

during said milling step, conducting charge developed in said conductive film;

removing said conductive film; and lapping said slider block to define an air bearing surface thereof.

6. The method of claim 5 wherein said film is silicon carbide.

7. the method of claim 6 wherein said step of removing said conductive film is performed using a plasma and wherein said plasma is an oxygen plasma.

8. The method of claim 5 wherein the step of milling further includes the step of grounding said conductive film.

9. The method according to claim 5 further comprising:

during the step of milling, applying a broad beam of electrons onto said surface while said focused ion beam is milling said portion of said head.

10. The method according to step 9 wherein said milling further comprises notching a portion of said head to form a write pole tip.

11. The method according to step 10 wherein said write pole tip is notched by said focused ion beam.

12. A magnetoresistive read/recording head assembly for use in a fixed disk drive data storage device wherein said head is formed by the steps of:

providing a slider block having a surface;

forming a magnetoresistive read/recording head on said surface;

applying a conductive film of carbon or silicon carbon over said head and on said block surface;

milling at least a portion of said head with a focused ion beam;

conducting charge developed during said milling using said conductive film;

placing said milled slider block in an oxygen plasma to chemically remove said conductive film; and removing said slider block together with the head formed thereon from said plasma.

13. The head assembly according to claim 12 wherein said portion of said head comprises a write tip thereof.

* * * * *